(12) United States Patent
Wilhelmsson et al.

(10) Patent No.: US 12,483,455 B2
(45) Date of Patent: Nov. 25, 2025

(54) TRANSMITTING DATA OR DETERMINING A FREQUENCY AND TIMING ESTIMATE OF A RECEIVED SIGNAL

(71) Applicant: Telefonaktiebolaget LM Ericsson (publ), Stockholm (SE)

(72) Inventors: Leif Wilhelmsson, Lund (SE); Miguel Lopez, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 18/281,717

(22) PCT Filed: Mar. 16, 2022

(86) PCT No.: PCT/EP2022/056792
§ 371 (c)(1),
(2) Date: Sep. 12, 2023

(87) PCT Pub. No.: WO2022/194918
PCT Pub. Date: Sep. 22, 2022

(65) Prior Publication Data
US 2024/0314011 A1    Sep. 19, 2024

Related U.S. Application Data

(60) Provisional application No. 63/161,659, filed on Mar. 16, 2021.

(51) Int. Cl.
*H04L 27/26* (2006.01)
*H04L 5/00* (2006.01)
*H04L 27/00* (2006.01)

(52) U.S. Cl.
CPC ........ *H04L 27/2613* (2013.01); *H04L 5/0048* (2013.01); *H04L 2027/0095* (2013.01)

(58) Field of Classification Search
CPC ............... H04L 27/2613; H04L 5/0048; H04L 2027/0095

(Continued)

(56) References Cited

U.S. PATENT DOCUMENTS 5,425,058 A * 6/1995 Mui .................... H04L 27/2338
                                                      375/336
6,356,607 B1 * 3/2002 Scott .................... H04J 13/107
                                                      375/E1.018

(Continued)

FOREIGN PATENT DOCUMENTS

EP        3490209 A1    5/2019

OTHER PUBLICATIONS

Fort, Andrew, et al., "A Performance and Complexity Comparison of Auto-Correlation and Cross-Correlation for OFDM Burst Synchronization", Proceedings of International Conference on Acoustics, Speech and Signal Processing, 2003, 1-4.

(Continued)

*Primary Examiner* — Emmanuel Bayard
(74) *Attorney, Agent, or Firm* — Murphy, Bilak & Homiller, PLLC

(57) ABSTRACT

Methods and apparatus are provided, including in an example a method for transmitting data, wherein the data includes a preamble. The method comprises transmitting the data including the preamble, wherein the preamble includes a first portion comprising a predetermined bit sequence repeated a predetermined number of times, and a second portion comprising a Barker bit sequence.

15 Claims, 15 Drawing Sheets

```
11001100 * * * * 1100110000001101010
```

K repetitions of 1100-pattern    13 bits Barker code 402                 400                 404

(58) Field of Classification Search
USPC .......................... 375/142, 262, 246, 295, 365
See application file for complete search history.

(56) References Cited

U.S. PATENT DOCUMENTS

| | | | |
|---|---|---|---|
| 2002/0090033 A1* | 7/2002 | Anderlind | H04L 1/004 |
| | | | 375/246 |
| 2006/0109780 A1* | 5/2006 | Fechtel | H04L 5/06 |
| | | | 370/203 |
| 2006/0114812 A1* | 6/2006 | Kim | H04L 27/2656 |
| | | | 370/206 |
| 2010/0309958 A1 | 12/2010 | Lakkis | |
| 2015/0237178 A1* | 8/2015 | Zhang | H04L 27/2603 |
| | | | 370/328 |
| 2016/0323056 A1* | 11/2016 | Park | H04J 13/107 |
| 2017/0048093 A1* | 2/2017 | Huang | H04L 27/2657 |
| 2019/0296889 A1 | 9/2019 | Oshiro et al. | |
| 2023/0119744 A1* | 4/2023 | Lin | H04L 5/001 |
| | | | 370/329 |

OTHER PUBLICATIONS

Kang, Kai, et al., "A Software Defined Open Wi-Fi Platform", Networks & Security, China Communications, Jul. 2017, 1-15.
Unknown, Author, "Bluetooth Core Specification", Version 5.2 | vol. 2, Part B, Dec. 31, 2019, 1-6.

* cited by examiner

102
Transmitting the data including the preamble, wherein the preamble includes a first portion comprising a predetermined bit sequence repeated a predetermined number of times, and a second portion comprising a Barker bit sequence

202
Obtaining samples of a preamble in a received signal

204
Performing autocorrelation of at least a first portion of the samples to determine a first frequency estimate of the received signal

206
Performing frequency correction on the samples based on the first frequency estimate to obtain first frequency corrected samples

208
Performing cross-correlation of at least a second portion of the first frequency corrected samples with a predetermined cross-correlation sequence to determine a timing estimate of the received signal, wherein the predetermined cross-correlation sequence includes a Barker bit sequence

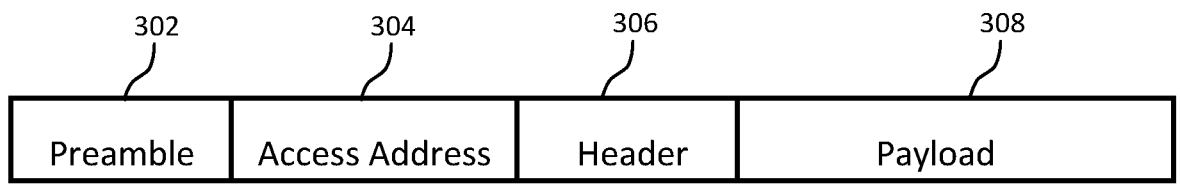
FIG. 3
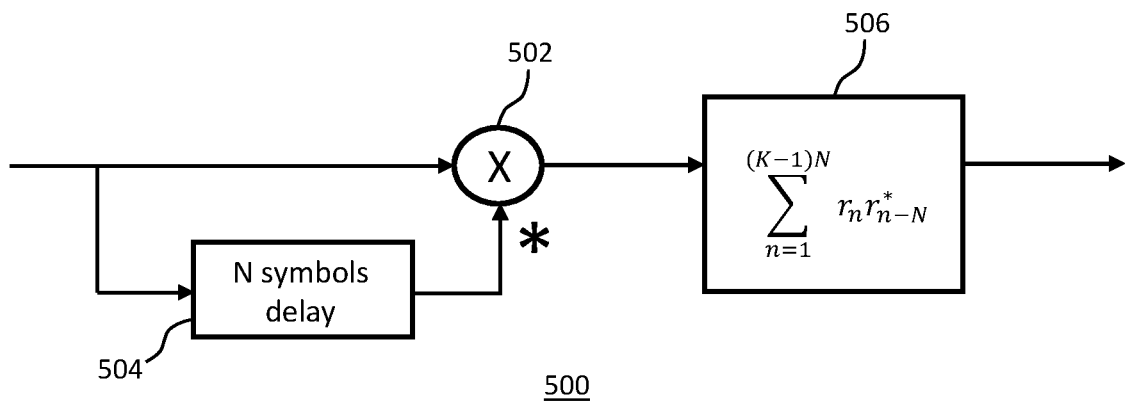
FIG. 4
FIG. 5

TRANSMITTING DATA OR DETERMINING A FREQUENCY AND TIMING ESTIMATE OF A RECEIVED SIGNAL

TECHNICAL FIELD

Examples of this disclosure relate to transmitting data or determining a frequency and timing estimate of a received signal.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In a communication system it is essential that the transmitter (TX) and the receiver (RX) are synchronized in both time and frequency. The exact requirements on synchronization will in particular depend on things like the symbol rate and the bandwidth of the signal. When it comes to time-synchronization, this typically has to be within a small fraction of the symbol duration, say within +−10% of the symbol duration. When it comes to frequency synchronization, this largely depends on whether the reception requires a stable phase reference (coherent detection) or not (non-coherent detection).

Several approaches exist for achieving time and frequency synchronization and which approach to take depends on several factors. Of particular concerns are the maximum frequency error that the receiver must be able to deal with and the signal-to-noise-ratio (SNR) where the synchronization must function properly. The real challenge is when the synchronization algorithm must be able to handle large frequency errors at low SNR. The reason for this can be explained as follows. If the maximum frequency error is large, it is not possible to base the synchronization on cross-correlation as the phase may vary too much due to the potentially large frequency error. A commonly used counter measure is then to differentiate the signal. However, when the SNR is low, differentiating the signal causes significant noise enhancement, leading to poor accuracy. Thus there is no simple approach that works well for large frequency uncertainties.

Another approach for synchronization is based on auto-correlation. One may also view auto-correlation as a differentiation of the signal. However, for this to work well, one needs have a large number of samples, and even then the performance may be poor. Especially when it comes to frequency estimation based on auto-correlation, the accuracy of the estimate will be inversely proportional to the maximum frequency error that needs to be handled. Thus, when the frequency uncertainty is large, one can expect a relatively poor accuracy when it comes to frequency estimation.

The standard approach when high performance is needed is to base the synchronization on cross-correlating the received signal with a known sequence. For this to work, however, the phase must not change too much during the correlation time, thus cross-correlation is only feasible when the frequency error is relatively small.

For low cost systems, like Bluetooth, the frequency uncertainly is quite large due to the usage of low cost components, especially low cost X-tals. For this reason, low cost systems do typically not achieve high performance in terms of spectrum efficiency since this would require a very accurate estimation of both time and frequency.

SUMMARY

A first aspect of the present disclosure provides a method for transmitting data, wherein the data includes a preamble. The method comprises transmitting the data including the preamble, wherein the preamble includes a first portion comprising a predetermined bit sequence repeated a predetermined number of times, and a second portion comprising a Barker bit sequence.

Another aspect of the present disclosure provides a method of determining a frequency and timing estimate of a received signal. The method comprises obtaining samples of a preamble in a received signal, performing autocorrelation of at least a first portion of the samples to determine a first frequency estimate of the received signal, and performing frequency correction on the samples based on the first frequency estimate to obtain first frequency corrected samples. The method also comprises performing cross-correlation of at least a second portion of the first frequency corrected samples with a predetermined cross-correlation sequence to determine a timing estimate of the received signal, wherein the predetermined cross-correlation sequence includes a Barker bit sequence.

A further aspect of the present disclosure provides apparatus for transmitting data, wherein the data includes a preamble. The apparatus comprising a processor and a memory, the memory containing instructions executable by the processor such that the apparatus is operable to transmit the data including the preamble, wherein the preamble includes a first portion comprising a predetermined bit sequence repeated a predetermined number of times, and a second portion comprising a Barker bit sequence.

A still further aspect of the present disclosure provides apparatus for determining a frequency and timing estimate of a received signal. The apparatus comprises a processor and a memory. The memory contains instructions executable by the processor such that the apparatus is operable to obtain samples of a preamble in a received signal, perform auto-correlation of at least a first portion of the samples to determine a first frequency estimate of the received signal, perform frequency correction on the samples based on the first frequency estimate to obtain first frequency corrected samples, and perform cross-correlation of at least a second portion of the first frequency corrected samples with a predetermined cross-correlation sequence to determine a timing estimate of the received signal, wherein the predetermined cross-correlation sequence includes a Barker bit sequence.

An additional aspect of the present disclosure provides apparatus for transmitting data, wherein the data includes a preamble. The apparatus is configured to transmit the data including the preamble, wherein the preamble includes a first portion comprising a predetermined bit sequence repeated a predetermined number of times, and a second portion comprising a Barker bit sequence.

Another aspect of the present disclosure provides apparatus for determining a frequency and timing estimate of a received signal. The apparatus is configured to obtain samples of a preamble in a received signal, perform autocorrelation of at least a first portion of the samples to determine a first frequency estimate of the received signal, perform frequency correction on the samples based on the first frequency estimate to obtain first frequency corrected samples, and perform cross-correlation of at least a second portion of the first frequency corrected samples with a predetermined cross-correlation sequence to determine a timing estimate of the received signal, wherein the predetermined cross-correlation sequence includes a Barker bit sequence.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 1 illustrates an example of a method for transmitting data;

FIG. 2 illustrates an example of a method of determining a frequency and timing estimate of a received signal;

FIG. 3 illustrates an example of a generic packet structure;

FIG. 4 illustrates how an example preamble is constructed;

FIG. 5 schematically illustrates an example of the principle behind autocorrelation;

DETAILED DESCRIPTION

Figure 6:
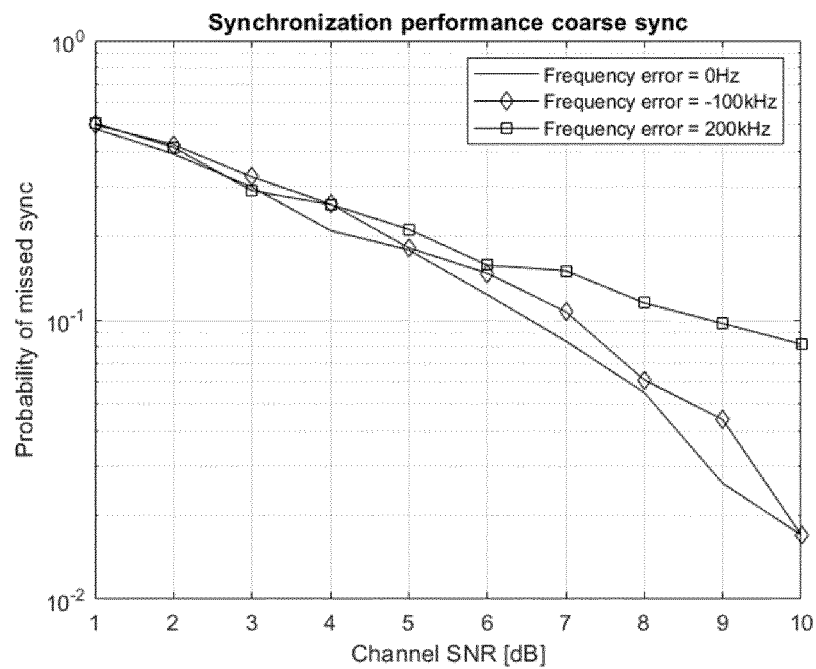
FIG. 6 illustrates an example of performance of the time-synchronization using auto-correlation.
Figure 7:
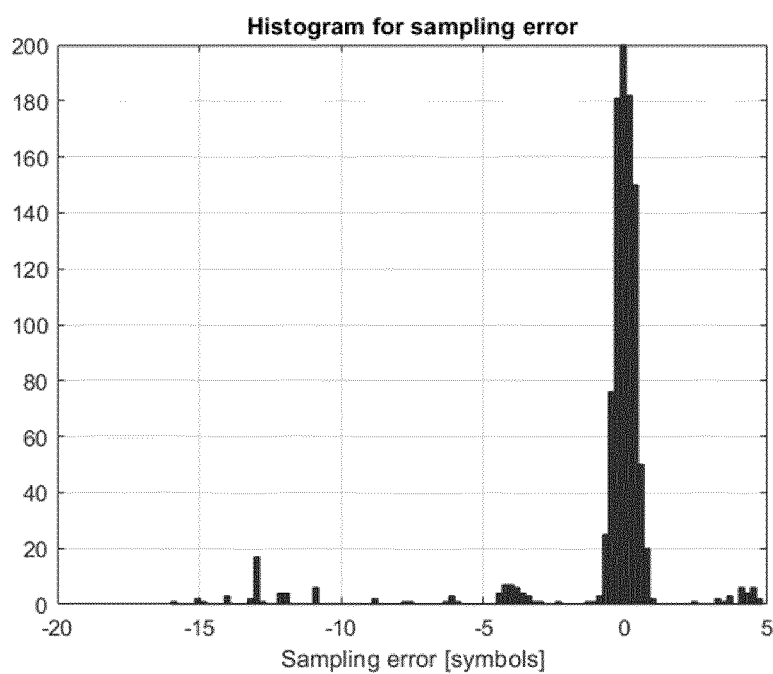
FIG. 7 shows an example of a histogram for a sampling error.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g. analog and/or discrete logic gates interconnected to perform a specialized function, Application Specific Integrated Circuits (ASICs), Programmable Logic Arrays (PLAs), etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g. digital or analogue) circuitry including but not limited to application specific integrated circuit(s) (ASIC) and/or field programmable gate array(s) (FPGA(s)), and (where appropriate) state machines capable of performing such functions.

There currently exist certain challenges. For example, existing solutions fail to achieve high performance when the frequency uncertainty is large relative to the symbol rate. Without high performance time and frequency synchronization, flexibility regarding data rates that can be supported may be limited. Due to the nature of the problem, i.e., that it is not possible to coherently add energy, the problem cannot easily be solved for example by extending the number of symbols used for synchronization.

Certain aspects of the present disclosure and their embodiments may provide solutions to these or other challenges. For example, proposed herein are examples of a method where time and frequency estimation is done in several steps, where the main purpose of the first step is to estimate the frequency efficiently by designing a transmitted sequence (e.g. a sequence in a preamble of transmitted data such as a packet or data unit) that may be based on the maximum frequency error that must be handled. A key property of the first step is that in some examples the frequency estimation may be relatively accurate, although time estimation (if performed in this first step) may be up to several symbols off. After the first step is done, the signal is frequency compensated using the estimated frequency, and a refined time and frequency estimation is performed. Therefore, in the second step, the remaining frequency error may be significantly reduced, and in addition the sequence design may in some examples be optimized to obtain very reliable time synchronization by including a Barker sequence that is sufficiently long for resolving the time uncertainty remaining after the first step. In an optional third step, the frequency estimation may be further improved, making use of the time synchronization that has been achieved.

Thus, example embodiments of this disclosure may provide a preamble intended for time synchronization and frequency estimation, the preamble consisting of two parts. For example, the preamble includes a first portion comprising a predetermined bit sequence repeated a predetermined number of times, and a second portion comprising a Barker bit sequence. Other example embodiments may provide receiver processing consisting of two or more steps, where the first step uses the first part of the preamble, and where the following step(s) uses the second part of the preamble and potentially also part or all of the first part of the preamble. The parts of the preamble may be in any order and one may even be embedded within the other in some examples.

Certain embodiments may provide one or more of the following technical advantage(s). For example, embodiments of this disclosure may allow for a low complex means to achieve time, frequency, and/or phase synchronization at very low overhead. Efficient frequency and phase synchronization is essential to support high performance coherent reception, which in turn is needed when high spectrum efficiency is targeted.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 1 illustrates an example of a method 100 for transmitting data e.g. a method of transmitting a packet, PDU etc. The data includes a preamble. The method 100 comprises, in step 102, transmitting the data including the preamble, wherein the preamble includes a first portion comprising a predetermined bit sequence repeated a predetermined number of times, and a second portion comprising a Barker bit sequence. In some examples, the receiver of the transmitted data performs the method of determining a frequency and timing estimate of a received signal as described herein.

Example embodiments of the method may include one or more of the following features. The first portion and the second portion may in some examples share one or more bits. Additionally or alternatively, the first portion of the preamble comprises a repeating predetermined symbol bit sequence. The number of bits in the predetermined symbol bit sequence may be 4 in some examples. The preamble may comprise 52 bits. The Barker bit sequence may comprise 13 bits. The predetermined bit sequence may comprise an even number of bits. A number of bits in the predetermined bit sequence with a value '1' may be equal to a number of bits in the first portion with a value '0'.

FIG. 2 illustrates an example of a method 200 of determining a frequency and timing estimate of a received signal in accordance with particular embodiments. The method 200 may be performed for example by a wireless device such as a User Equipment (UE), and thus the signal may be received for example from a base station or another UE. Alternatively the method may be performed for example by a base station, and thus the signal may be received for example from a UE. The method 200 comprises, in step 202, obtaining samples of a preamble in a received signal and, in step 204, performing autocorrelation of at least a first portion of the samples to determine a first frequency estimate of the received signal. The preamble may in some examples be part of transmitted data such as for example a packet, a data unit such as a protocol data unit (PDU), or any other unit or quantity of data.

The method 200 also comprises, in step 206, performing frequency correction on the samples based on the first frequency estimate to obtain first frequency corrected samples. An example of frequency correction is as follows: if there is a frequency error of alpha rads/sample, then value A of the autocorrelation peak will be complex-valued, and the argument of its mean value is alpha*N. Thus, an estimate of the frequency error alpha can be obtained from the autocorrelator. Frequency correction may be achieved for example by rotating the received samples by the negative of the angle alpha. The frequency error that needs to be estimated and corrected may in some examples be due to a mismatch between the carrier frequency used by the transmitter and carrier frequency used by the receiver. To allow for high performance reception, in some examples, this frequency error may be estimated and compensated at the receiver. Once the frequency error is estimated, there are different alternatives for how to compensate for this. One possibility is to adjust the frequency generation itself, i.e., the local oscillator. An alternative is to perform the compensation in the digital domain. Which one is the preferred approach may depend on how large the frequency is and other considerations. It is also possible to do part of the correction by adjusting the local oscillator and part of the correction in the digital domain.

The method 200 also comprises, in step 208 performing cross-correlation of at least a second portion of the first frequency corrected samples with a predetermined cross-correlation bit sequence to determine a timing estimate of the received signal, wherein the predetermined cross-correlation bit sequence includes a Barker bit sequence. The predetermined cross-correlation sequence may also in some examples include a part of the preamble other than the Barker sequence, and/or may include for example part of the preamble for which the first portion of the samples were obtained.

In some examples, performing autocorrelation of at least the first portion of the samples also determines an initial timing estimate of the received signal. Thus, for example, determining the first frequency estimate may be based on the initial timing estimate, that is, may use the initial timing estimate. The initial timing estimate may be for example an initial "coarse" or "rough" timing estimate that may be refined in the step of performing cross-correlation, or may be discarded in favour of the timing estimate determined in that step.

The method in some examples may also comprise determining a further frequency estimate of the received signal based on the first frequency corrected samples and the timing estimate. Thus a third step may obtain an even more accurate estimate of the frequency or frequency error. Determining the further frequency estimate may in some examples comprise determining phases of a plurality of the samples, and determining the further frequency estimate from the phases of the plurality of the samples. For examples, determining the further frequency estimate from the phases of the plurality of the samples may comprise determining a linear model from the phases of the plurality of the samples, and determining a least squares solution to the linear model to obtain the further frequency estimate.

The method may also in some examples comprise performing frequency correction on the first frequency corrected samples based on the further frequency estimate to obtain second frequency corrected samples, and in some examples may also comprise determining a phase of at least one of the second frequency corrected samples, and obtaining further samples of the received signal based on the determined phase. The phase may for example be determined from the latest sample in second frequency corrected samples of the preamble.

In some examples, the method comprises determining a phase of one or more of the first frequency corrected samples (e.g. a latest one in the first frequency corrected samples of the preamble), and obtaining further samples of the received signal based on the determined phase.

In some examples, one or more samples in the first portion of the samples are also samples in the second portion of the samples. Thus for example there may be some overlap between a first part and a second part of the preamble, where the first and second parts share some bits. Thus, for example, if the first part ends with one or more bits of particular values, and the second part starts with the same bit(s), then these bit(s) do not have to be repeated and are included only once in the preamble. This reduces the size of the preamble compared to if there is no overlap between the parts of the preamble.

Performing cross-correlation of at least a second portion of the first frequency corrected samples with a predetermined cross-correlation bit sequence to determine timing estimate of the received signal in some examples comprises performing cross-correlation with a symbol bit sequence comprising the Barker bit sequence and a predetermined symbol bit sequence. Thus, for example, cross-correlation may be performed using both the Barker sequence and a known bit sequence in a first part of the preamble, which may provide a more accurate timing estimate than if only the Barker sequence is used for timing estimation.

The first portion of the samples may comprise for example samples of a portion of the signal comprising a repeating predetermined bit sequence. In some examples, the number of bits in the predetermined symbol bit sequence is 4. In some examples, the predetermined bit sequence comprises an even number of bits. Further, in some examples, a number of bits in the predetermined bit sequence with a value '1' is equal to a number of bits in the first portion with a value '0'. This may ensure in some examples that methods of this disclosure operate correctly with transmitters that use a nonlinear or rotating modulator.

The preamble of the received signal comprises 52 bits in some examples. In some examples, the Barker bit sequence has 13 bits. Thus, for example, the first part of the preamble with a repeating sequence may comprise 40 bits in total, where one bit is shared between the end of the first part and the start of the Barker sequence.

Particular example embodiments will now be described. In the following, an example method will be described for a specific example targeting a high data throughput (HDT) mode for Bluetooth Low Energy (BLE). The method may be adapted for other communication technologies and/or modes.

In several wireless systems in use today, packets sent from the transmitter to the receiver are self-contained, i.e., the packet contains fields for packet acquisition as well as for estimation of all necessary parameters in addition to the control information and the user data. The exact structure may vary between different standards, depending on what design choices have been made. An example of a generic packet structure 300 is illustrated in FIG. 3. The packet 300 includes the following fields: a preamble 302, access address 304, header 306 and payload 308. The different fields of the packet may have the following purposes in some examples:

Preamble: The preamble 302 may be used for packet acquisition, i.e., to detect the presence of a packet. In addition, the preamble 302 may also allow for estimation of one or more different parameters essential for the further processing of the packet. Example of such parameters are time, frequency, and phase. In case equalization is needed for further processing of the packet, the preamble 302 may also be used for channel estimation needed for equalizer.

Access Address: The access address 304 may be used to determine whether the packet is intended for a specific receiver or not. After having synchronized by means of the preamble 302, the receiver may demodulate and decode the access address 304 to determine whether the packet should be processed further or if the packet is intended for another user. The access address 304 may either be used to address a specific user, often referred to as unicast, or it may be used to address a group of users, often referred to as multi-cast or broadcast. If the receiver determines that the access address 304 does not match one of the addresses where the packet should be processed further, the receiver may abort processing and would typically enter a low power mode. If, on the other hand, it is determined that the packet is intended for the receiver, the receiver may continue the reception by processing the header. Noteworthy is that, in some examples, the better the parameter estimation can be performed by using the preamble 302, the more reliably the access address 304 can be detected.

Header: The packet header 306 may contain control information required to eventually demodulate the payload. Typical contents of the header 306 may include packet length (typically measured in number of bytes), the modulation and coding scheme (MCS) used for the payload, and/or other control information needed for decoding of the payload. In addition, the header 306 may contain control information related to whether the previous received packet was correctly received (by the transmitter of the current packet) or if a retransmission is needed, i.e. an ACK/NACK bit may also be present. When more elaborate retransmission schemes are used, the header 306 may contain sequence numbers, flow control bits, and multiple ACK/NACK bits in case a packet contains two or more segments that can be individually ACK/NACKed. Since the information carried in the header field 306 may be important for keeping the link alive, the header 306 may be transmitted with the most robust modulation and coding scheme (MCS).

Payload: The payload 308 contains the user data. The MCS used for the payload can in some examples be adapted to the channel conditions such that a more robust MCS is used when the channel conditions are more challenging (e.g. lower signal-to-noise-ratio, SNR) and a MCS supporting higher data rate may be used when the channel conditions are more favorable (e.g. higher SNR).

The example packet structure and the packet processing described above may be different in some examples. For example, in Bluetooth, the access address is intentionally coded using a relatively strong code, and then effectively used also for time and frequency estimation. In IEEE 802.11, the access address is part of the payload. This means that a receiver has to perform more processing before one can determine whether the packet is intended for that receiver or another receiver, but it allows for the access address to be sent using a more spectrum efficient MCS when the channel conditions allows.

Embodiments of this disclosure may relate to systematic design of a preamble and efficient processing of the preamble to allow for reliable reception of the fields following the preamble. An illustration of how an example preamble 400 is constructed is shown in FIG. 4. The first part 402 consists of repetitive pattern or sequence of bits, repeated K times. In the example shown in FIG. 4, the sequence is a 4 bit sequence of the bits 1100. The length N of the repetitive pattern may in some examples at least in part be based on the maximum frequency error that needs to be handled. The repetitive pattern/sequence may allow a receiver to use auto-correlation for performing initial (coarse) time and/or frequency estimation. An example of the principle behind autocorrelation is illustrated schematically in FIG. 5 and described as follows.

The input signal is first multiplied by multiplier 502 with the complex conjugate of a delayed version of the input signal provided by N symbols delay block 504. The result of this multiplication is then summed for a number of samples in block 506. Referring to FIGS. 4 and 5, a suitable number of terms in the sum may be for example (K−1)N. This corresponds to the maximum number of terms where the delayed version and the non-delayed version in the preamble have are identical, although in other embodiments a different number of terms may be chosen.

If the input signal has a frequency error, fe, then at the correct time instant the phase of the output of the autocorrelator will be 2*pi*fe*Tdelay, where Tdelay is the time corresponding to N symbols delay. Since Tdelay is known, this phase can be used to estimate the frequency error, fe, provided it is not too large. Specifically, for example, the frequency error must not satisfy |2*pi*fe*Tdelay|>pi. That is, the maximum frequency error that can be estimated is 1/(2*Tdelay), so as not to have ambiguity due to aliasing. Therefore, in some example embodiments of this disclosure, Tdelay is selected to be less than 1/(2*fe), but may in some examples be as large as possible without any risk of aliasing.

In some examples, if the preamble illustrated in FIG. 4 is fed to a nonlinear modulator or to a linear modulator that rotates the modulation alphabet, the generated waveform corresponding to the repeated bit pattern may not be periodic. That is, if t represents time and r(t) is the baseband signal, it can happen that r(t) is different from r(t−Tdelay). This may be for example due to the memory in nonlinear modulations such as GMSK and GFSK, and due to the phase rotation in linear modulations such as pi/2-BPSK, pi/4-QPSK. Since periodicity of the waveform is desirable when performing autocorrelation as shown in FIG. 5, it is advantageous to choose the N bits in the bit pattern which is repeated K times such that:
  1. The number N of bits in the bit pattern is even; and
  2. The number of 0's in the bit pattern is equal to the number of 1's.

These two conditions may for example ensure that the baseband signal is periodic with period Tdelay. The reason is that, for example, in order to obtain periodicity the phase must return to its initial state at the time Tdelay which corresponds to the end of the last bit period in the N bit pattern. In practice, the N bit pattern may in some examples be further optimized to suppress sidelobes in the autocorrelation and thus increase the performance of the autocorrelator shown in FIG. 5.

A specific example is now provided. Suppose that the symbol rate is 2 Msymbols/s (Ms/s) and that the maximum frequency error is +−200 kHz. This leads to Tdelay<1/400 kHz=2.5 us. This corresponds to N=5 symbols at 2 Ms/s, but to get some margin to aliasing, N=4 is selected. The need for a margin comes from the fact that if one in the noiseless case would obtain a phase close to +pi, this could in some examples in a noisy situation be misinterpreted as −pi, resulting a huge estimating error.

The auto-correlation block (e.g. block 506 shown in FIG. 5) is rather robust, but it may in some examples have two shortcomings. The first is that the frequency estimate may not be as accurate as desired. The second is that, due to the repetitive pattern, around the main peak at the output of the correlator there may be smaller peaks implying that the timing may not be accurately determined when the SNR is low. However, even if the timing is slightly inaccurate, the frequency estimate may still be almost as good.

To address that the peak found by means of auto-correlation may be slightly wrong, in some examples, the preamble contains a Barker code, for example in the last part of the preamble. In FIG. 4, the length of the Barker code is 13 bits, which is the longest known Barker code. However, the principle is applicable if a shorter Barker code is used.

The second step of the processing of the preamble makes use of the Barker code (also referred to herein as a Barker sequence) by cross-correlating the received sequence, after being frequency corrected, with a suitable part of the preamble. This suitable part of the preamble may be only the Barker code, it may be the entire preamble, or something in between (e.g. at least some or all of the first part of the preamble with the repeating pattern, and at least part or all of the Barker code). Due to the very good correlation properties of the Barker code, and the fact that the timing error after the coarse time estimation obtained from autocorrelation may be relatively small, this may allow for a very good time acquisition (timing estimate of the received signal). It is noted that in some examples the frequency error is reduced (e.g. to obtain frequency corrected samples of the received signal) before the cross-correlation step is done. As a numerical example, suppose that the preamble is designed with K=9 repetition of a N=4 long pattern. This results in a preamble that is 52 symbols long if a 13 bit Barker code is used, and one bit is common (shared) between the repetitive pattern and the Barker code as illustrated in FIG. 4. That is, in this example, the very last bit with the value '0' in the last repetition of the first part of the preamble is also the first bit in the Barker sequence.

In an example, suppose the symbol rate is 2 Ms/s so that the duration of the preamble equals 26 us. As a rule-of-thumb, if coherent accumulation is done, the phase change due to a frequency error should not exceed 2pi/3. Applying this rule-of-thumb, the maximum frequency error that can be handled by coherent accumulation is 1/(3*26 us)=13 KHz.

Thus, after the second step, making use of the good correlation properties of the Barker sequence, it can be assumed that timing is found with high accuracy. Having obtained the timing, it is also possible to enhance the frequency estimation even further if found desirable. Alternatively, one may consider the frequency estimate obtained from the first step to be sufficiently good and may omit this third step.

In some examples, however, it may be desirable to have an estimate of the phase at the start of the received access address in order to perform coherent reception (or otherwise to perform reception of the signal using the estimated phase). There are several possibilities to achieve this, for example by relying on the fact that that since the phase of the transmitted preamble is known, the phase rotation caused by the channel can easily be determined.

Here is disclosed an example of a third step where the residual frequency error and the phase for the first symbol of the access address are estimated simultaneously by means of a least squares (LS) approach as outlined below. Alternative examples are also discussed. With the correct timing, we first calculate the phase of the channel for a suitable set of symbols in the preamble. To continue the example above with the 52 symbol length preamble, the channel phases for the 52 symbols are calculated, e.g. by dividing the received symbols by the known transmitted symbols and consider the phases of the ratio.

Denoting these phases phi1, phi2, . . . , phi52, it follows that the frequency error of the signal may be estimated by considering how these phases change. Suppose that one would find that the phase change between two symbols, i.e., phiN−phi(N−1), is delta_phi, then the frequency error may be determined to be fe=delta_phi/(2*pi*Ts), where Ts is the duration of one symbol in the preamble.

To achieve a much more accurate frequency estimate, one may for example estimate the total phase change during the 52 symbols long preamble and divide by the corresponding time, i.e. fe=(phi52−phi1)/(2*pi*51*Ts). Assuming that the error (variance) in the phase estimates are the same as when an estimate is done using a delay of only one symbol, it follows that the variance from the estimate using a larger delay is significantly reduced.

An example alternative approach for estimating the frequency error, and the approach used for generating the simulation results provided later in this disclosure, is to use a least squares (LS) approach. Specifically, using the different phases phi1, phi2, . . . , phi52, a linear model for the phase change is assumed, phi_n=phi_0+n*delta_phi. The LS solution will then give both phi_0 and delta_phi. As described above, delta_phi is used to calculate the frequency error. If coherent reception is desirable for the fields following the preamble, e.g. the access address 304 in case of a packet structure 300 as illustrated in FIG. 3, knowledge of the phase (in addition to the frequency error) may be needed. Clearly, with knowledge of phi_0 and delta_phi, it is possible to accurately estimate the phase for the first symbol of the Access Address.

Although the LS approach for estimating the phase and frequency is believed to be an attractive and also computationally efficient method, alternative methods exist. This disclosure is not limited to a specific algorithm for how a refined frequency estimation (e.g. second frequency corrected samples referred to above) may be determined or how the phase is estimated. As an alternative to the LS approach and to the approach where one just considers two phases and divides with the corresponding time, for example, one may also consider weighted LS, where one also takes into account that some of the phase estimates may be less reliable and are given a smaller weight when determining the LS estimate.

Having explained examples and principles of the preamble design, some simulation results are provided to further illustrate the working principle and effects of embodiments of this disclosure.

In FIG. 6, which illustrates an example of performance of the time-synchronization using auto-correlation, the performance for the coarse time synchronization in the first step based on auto-correlation is depicted as a function of the SNR. A synchronization is here defined as missed if the found synchronization time is more that 40% of a symbol from the ideal synchronization time. This can be viewed as rather optimistic, and consequently the result may be noticeably worse in a case where a more stringent requirement would be imposed. However, since the purpose of the coarse synchronization is merely to obtain a coarse time estimation, a timing error corresponding to 40% of the symbol time may instead be seen as too restrictive. The synchronization performance is evaluated for three different frequency errors, namely 0 Hz, −100 kHz, and 200 kHz, to verify that the algorithm is able to handle large frequency errors. As discussed above, the design is in this example is targeting a maximum frequency error of about 250 KHz.

To gain more insight into the synchronization performance, it is also useful to consider how the synchronization errors are distributed. In Error! Reference source not found., a histogram for the synchronization error is shown for SNR=5 dB. The total number of performed synchronizations is 1000. As can be seen, the synchronization error is concentrated around the correct sampling time, and in addition there are a relatively large number of errors at a magnitude of +−4 symbols. The reason for the relatively large number of errors at +−4 symbols can be understood by considering the structure of the preamble in Error! Reference source not found. The reason for the large number of errors is that the preamble is repetitive with a period of 4 symbols.

Figure 8:
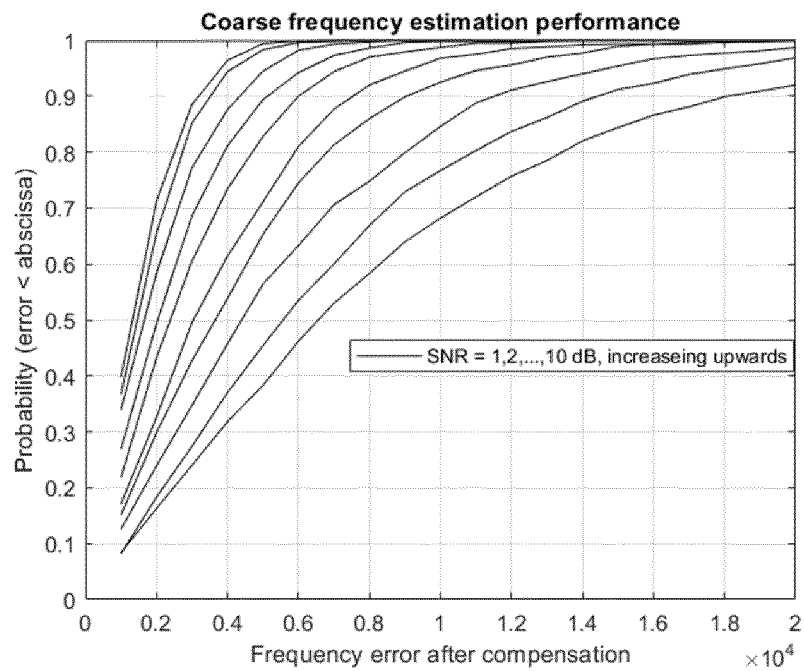
FIG. 8 shows an example of the cumulative distribution function (CDF) of the frequency estimation error obtained by the coarse estimation based on auto-correlation.

Referring to Error! Reference source not found., which shows an example of a histogram for sampling errors, measured in symbols, it can be concluded that if a refined synchronization is done over, say, +−5 symbols, the correct sampling will with high probability be found provided one can cross-correlate the received sequence with the Barker sequence. As discussed above, the main purpose of the coarse synchronization may be therefore to estimate the frequency error and compensate for this so that a refined time and frequency estimation can be based on cross correlation. The performance with respect to frequency estimation is shown in FIG. 8, which shows an example of the cumulative distribution function (CDF) of the frequency estimation error obtained by the coarse estimation based on auto-correlation.

Since the received signal may be compensated with estimated frequency error (e.g. to obtain the first frequency corrected samples discussed above), the estimation error of the coarse frequency estimation equals the frequency error after compensation, i.e., the frequency error the signal will have when processed in the second step by means of cross-correlation. In the discussion above when the requirements for successful cross-correlation in an example were discussed, it was found that if the preamble is 52 symbols, corresponding to 26 us, the frequency error should not exceed 13 kHz. Now, referring to FIG. 8, it is found that 90% of all estimates have an error that is less than 13 kHz. When the SNR is 4-5 dB or more, the probability that the frequency estimation error is less than 13 KHz is almost 100%, indicating that with very high probability it is feasible to perform cross-correlation using the entire preamble.

Figure 9:
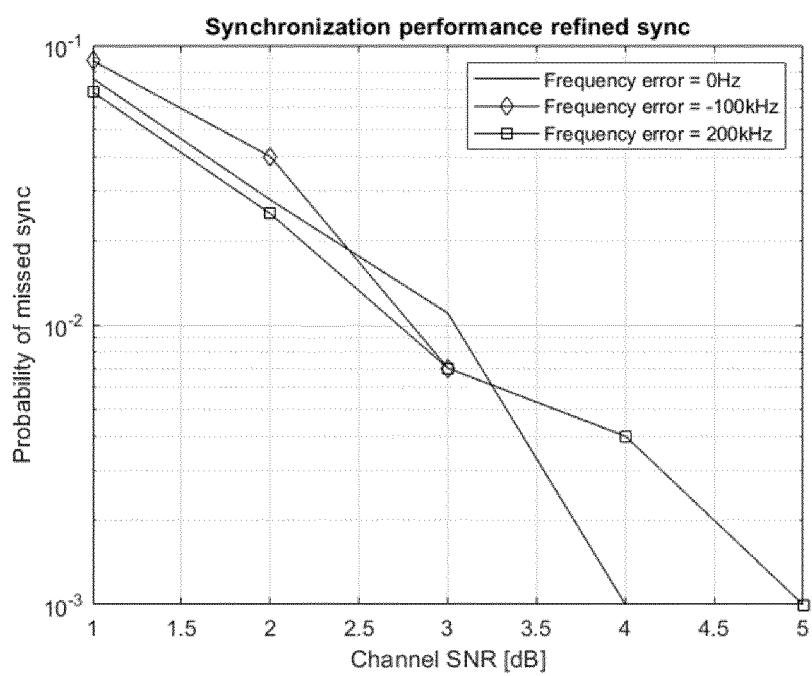
FIG. 9 illustrates an example of synchronization performance based on cross-correlation.

The synchronization performance of the second step, based on cross-correlation, is shown in FIG. 9, which illustrates an example of synchronization performance based on cross-correlation. As can be seen, the performance for the synchronization is considerably better when cross-correlation can be used.

Figure 10:
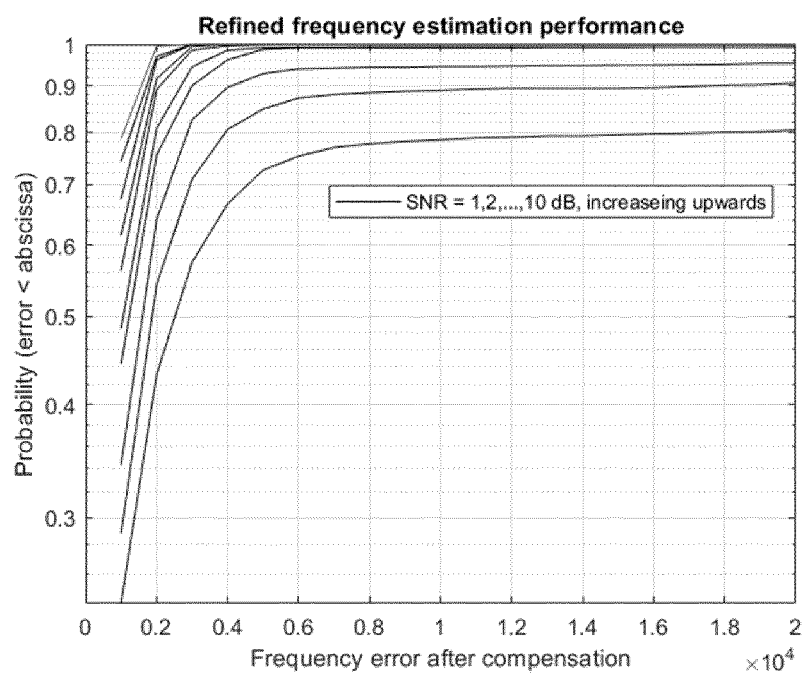
FIG. 10 shows an example of a CDF for the frequency estimation error obtained by the coarse estimation based on auto-correlation.

The frequency estimation performance for the second step is shown in FIG. 10, which shows an example of a CDF for the frequency estimation error obtained by the coarse estimation based on auto-correlation. As can be seen, the performance for SNR=5 dB or higher has an estimation error that is less than 6 kHz with close to 100% probability. For smaller SNR, the performance reaches a percentage where the estimation error remains large. The explanation for this is that at low SNR there is a risk that the initial frequency estimation is not good enough to allow the refined frequency estimation to work as intended, and then the refined frequency estimate may actually be worse than the initial estimate. As the SNR can be assumed to be accurately determined at the receiver, it is possible in some examples for the receiver to simply use the coarse frequency estimate when the SNR is low.

How a large frequency error can be handled by the third step in order to result in an improved frequency estimate depends on the length of the sequence used for the second frequency estimation. In the example simulations above, the full 52 symbols were used. If one instead would use, say, 26 symbols, then the refined frequency estimation may work at up to twice as large frequency error.

A first particular example embodiment covers the preamble structure where that consists of two parts, where the first part is based on a repetitive pattern/bit sequence and where the second part of the preamble is a Barker sequence. Also, the repetitive pattern preferably has a period such that is selected based on the maximum expected frequency error in such a way that the time for one period is less than 1/(2*fe), where fe is the maximum frequency error. Also, the number of periods (number of repetitive patterns) may be selected based on the required SNR where synchronization must work properly. Also, the repetitive pattern may have one or more symbols or bits that belong also to the Barker sequence (as illustrated in Error! Reference source not found.) to enable that the total length of the preamble is 8N bits, where N is an integer >3. Furthermore, it may be advantageous to choose N to be an even number and the N-bit pattern to comprise as many logical ones as logical zeros. In one example the repetitive pattern has period N=4 and the Baker sequence is of length 13.

A second particular example embodiment is concerned with the receiver processing. Specifically, according to this embodiment the receiver processing consists of two or more steps. The first step in the receiver processing is based on auto-correlation and makes use of the first part of the preamble for estimating time and frequency of a received signal including a preamble. The result of the first step is used to enable the second step of the receiver processing. This enabling includes adjusting the frequency of the received signal (e.g. frequency correction) based on the estimated frequency from the first step with the goal of reducing the frequency error of the signal prior to the receiver processing according to the second step. The second step is based on cross-correlation of the received signal, after the frequency correction, with a part of the preamble and where the part of the preamble includes the Barker sequence. Also, the part of the preamble may include the Barker sequence and a number of periods (one, more than one or all) of the repetitive pattern, or the part of the preamble may be the entire preamble.

The result of the second step is a refined time-synchronization. After the second step, i.e. when a refined time-synchronization is achieved, a third step may be performed in some examples in which a refined estimation of the frequency is performed, or a refined estimation of the frequency and an estimation of the phase for a specific symbol is obtained. The third step may be based for example on estimating how the phase changes during the reception of a number of received symbols and use this to estimate the frequency and the phase. This simultaneous estimation of frequency and phase may for example be based on the method of least squares.

Figure 11:
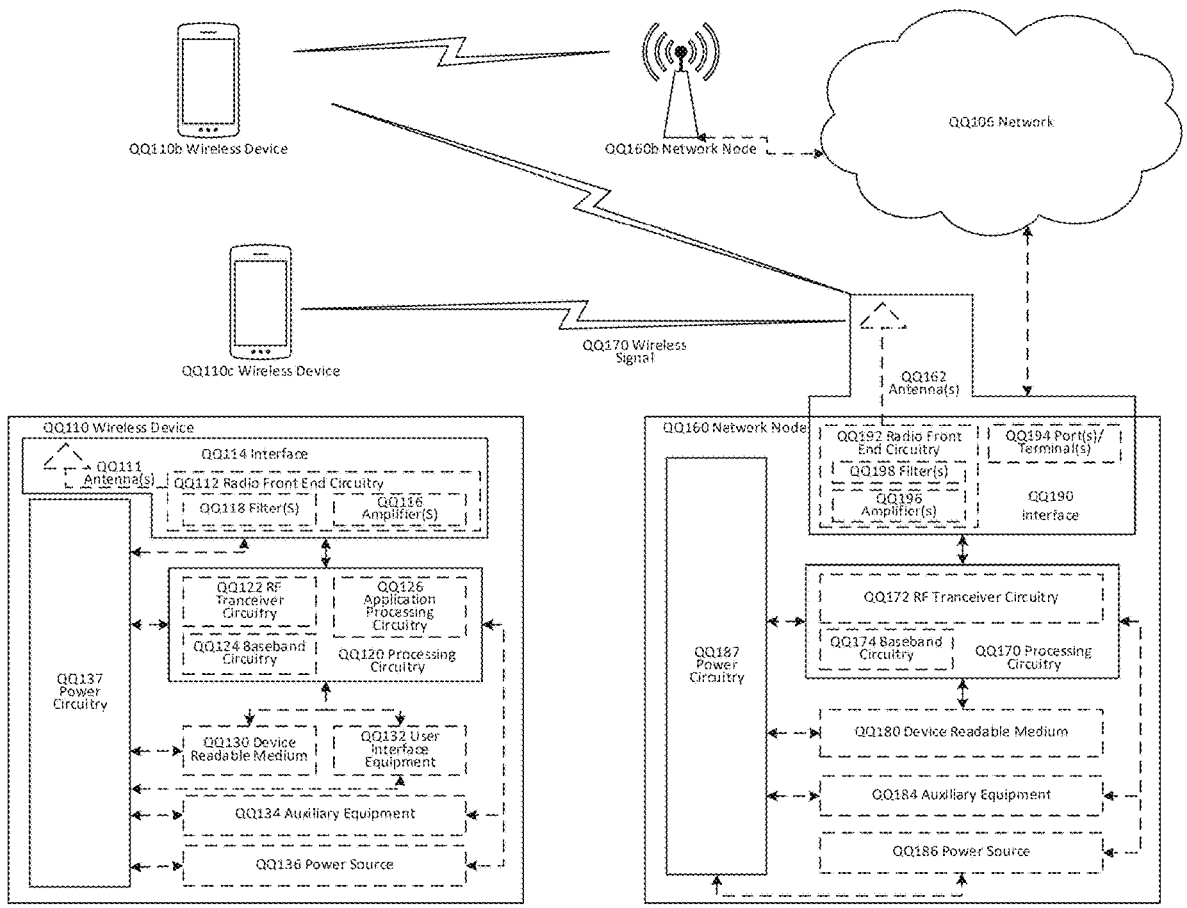
FIG. 11 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
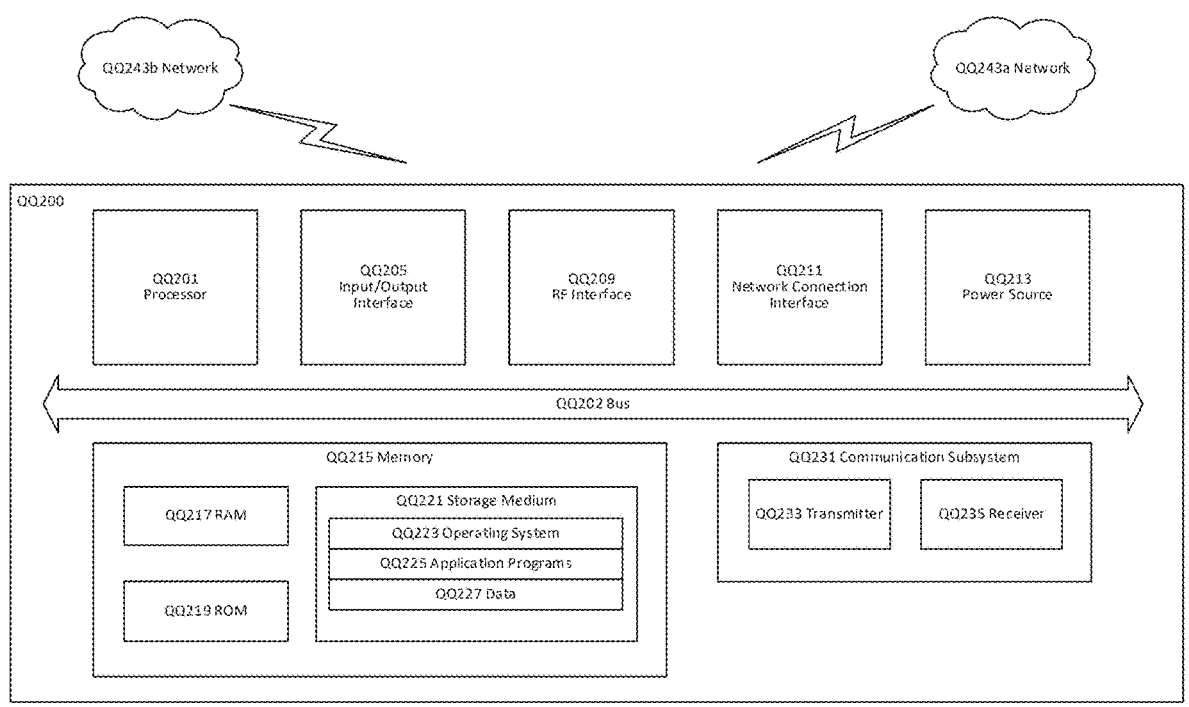
FIG. 12 shows an example of a User Equipment (UE) in accordance with some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
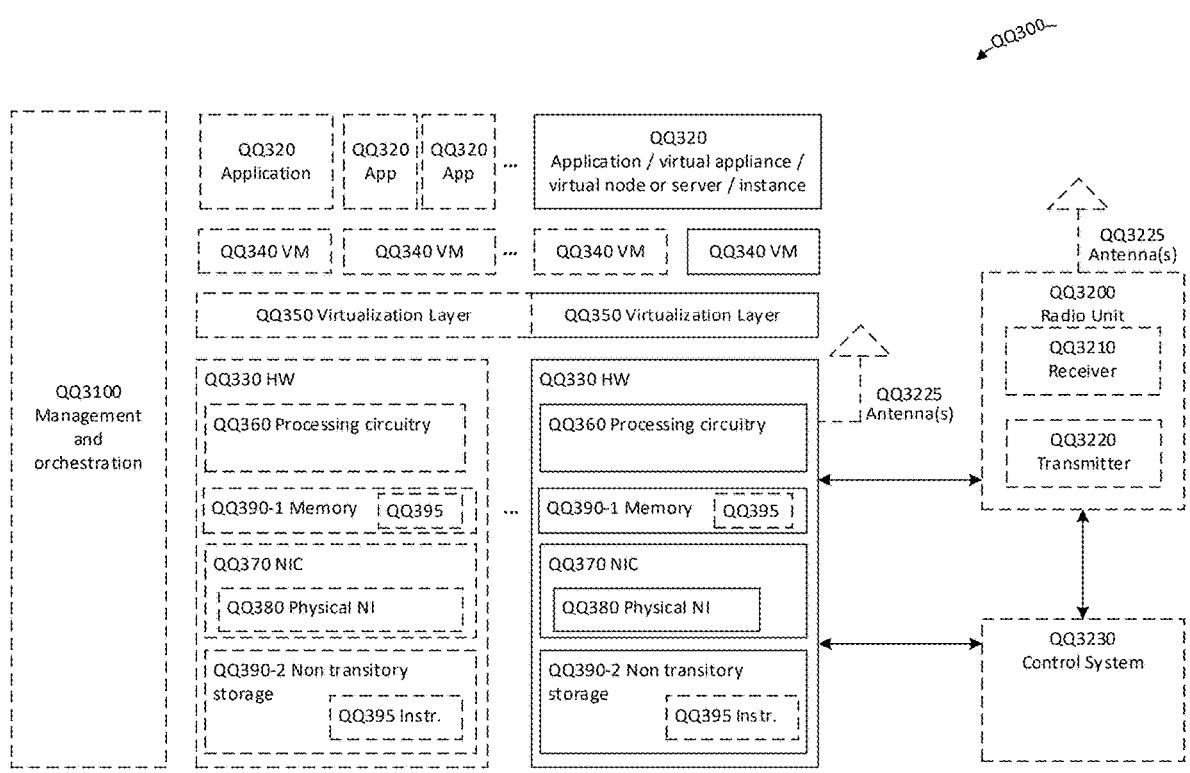
FIG. 13 is a schematic block diagram illustrating a virtualization environment in accordance with some embodiments.

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
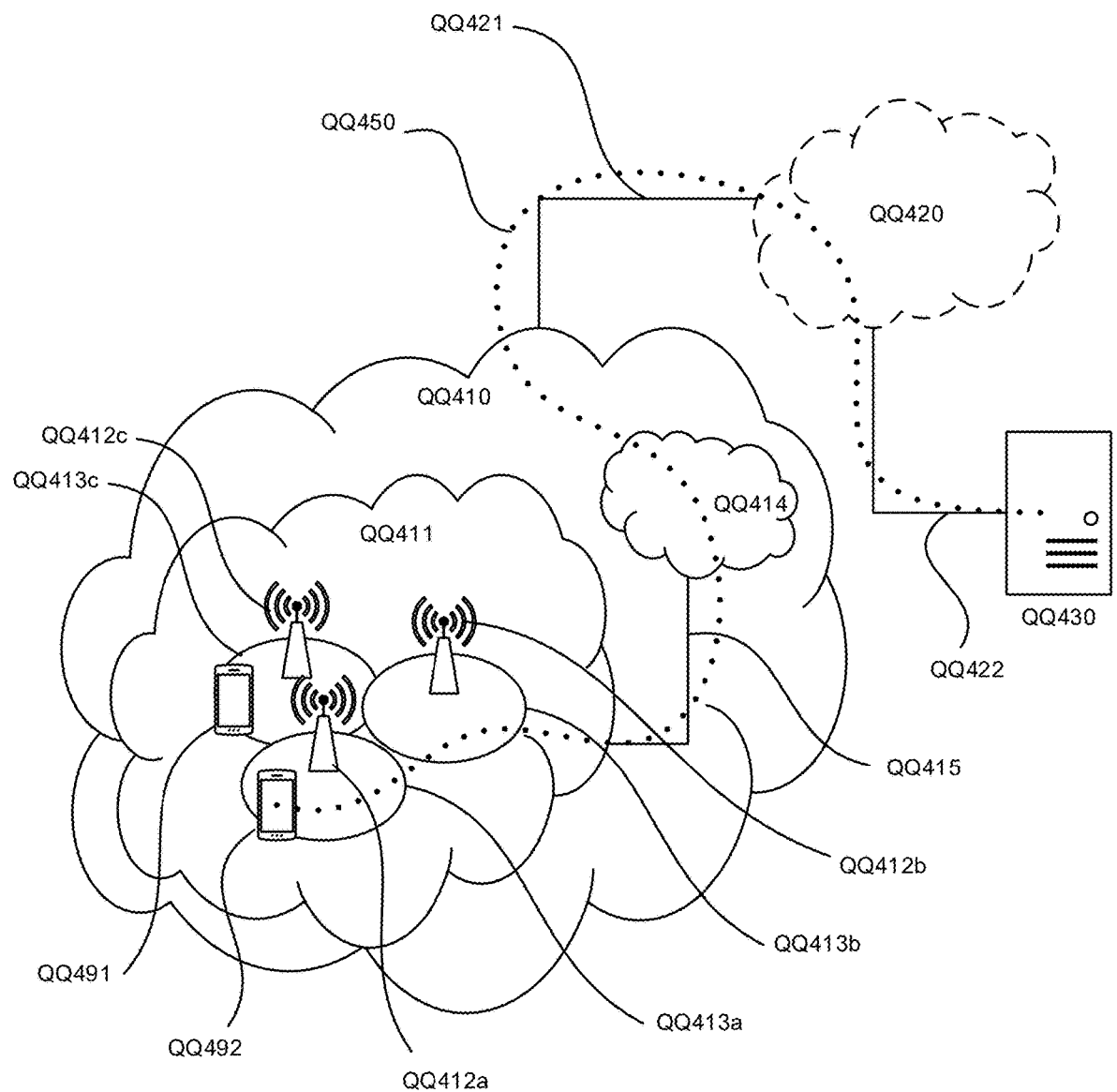
FIG. 14 shows a telecommunication network connected via an intermediate network to a host computer in accordance with some embodiments.

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 15:
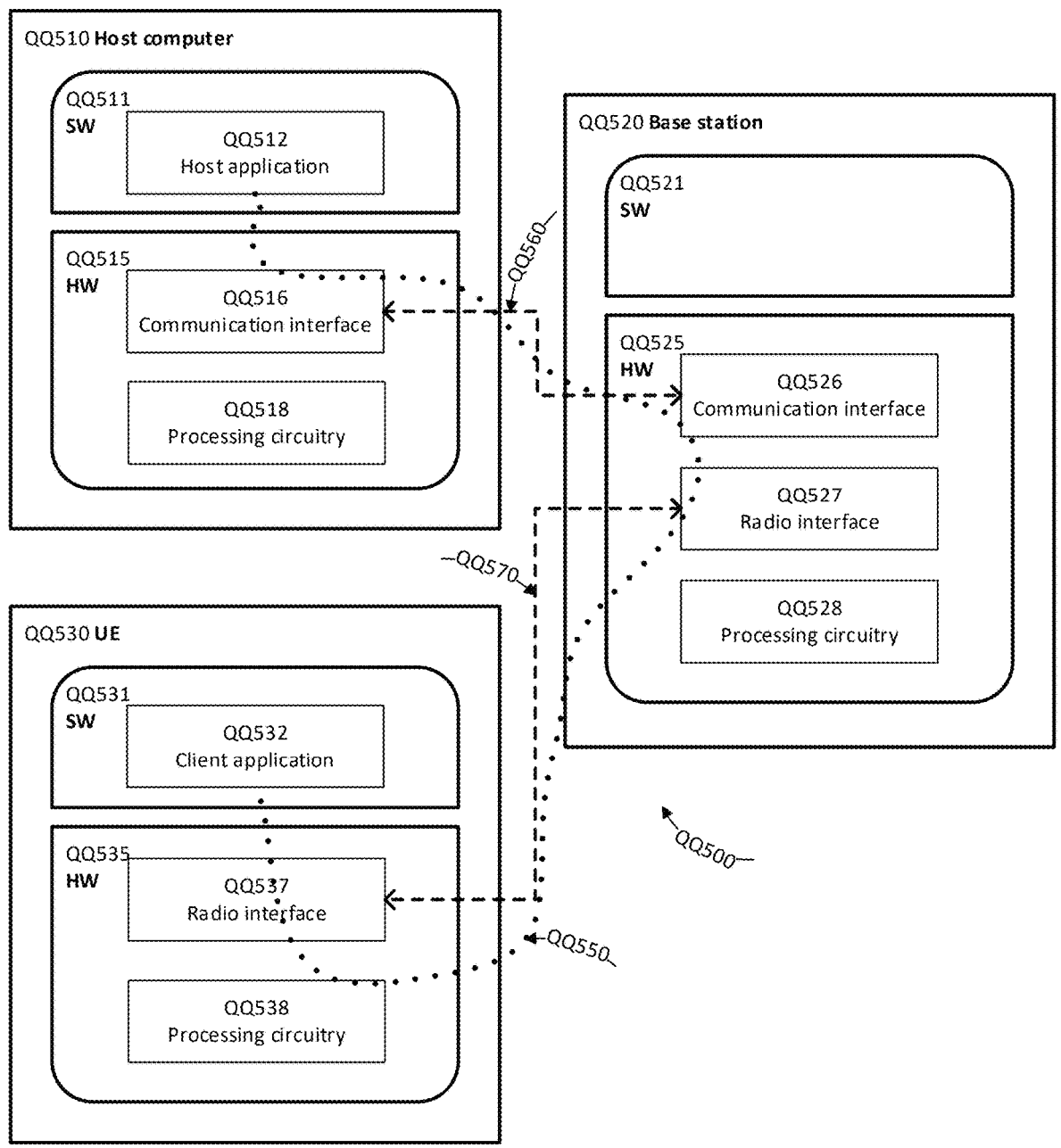
FIG. 15 shows a host computer communicating via a base station with a user equipment over a partially wireless connection in accordance with some embodiments.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the time and/or frequency estimate of the received signal and thereby provide benefits such as simplified processing, improved battery life, improved receiver performance, etc.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
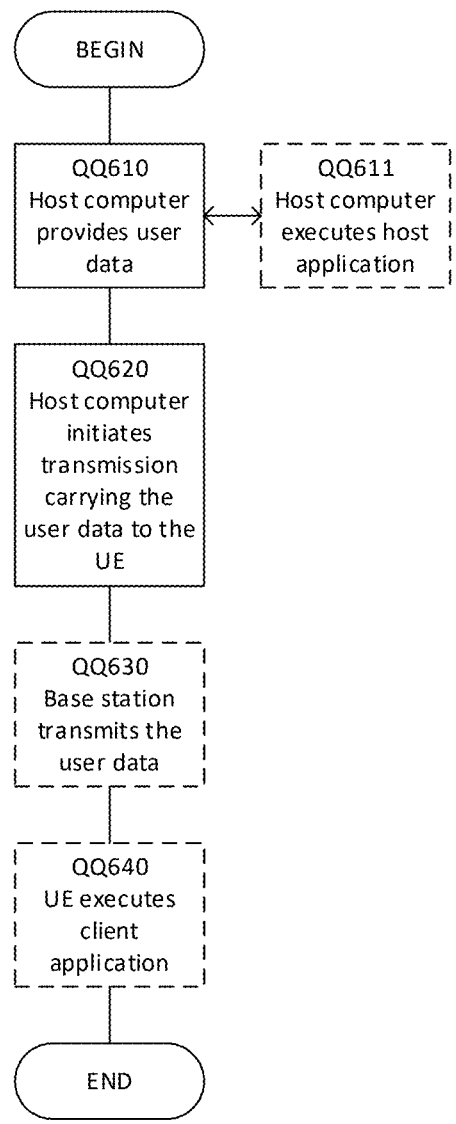
FIG. 16 shows methods implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
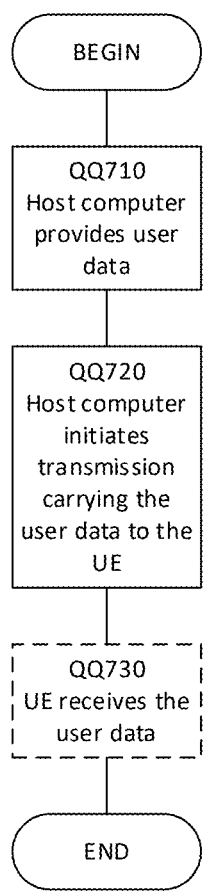
FIG. 17 shows methods implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
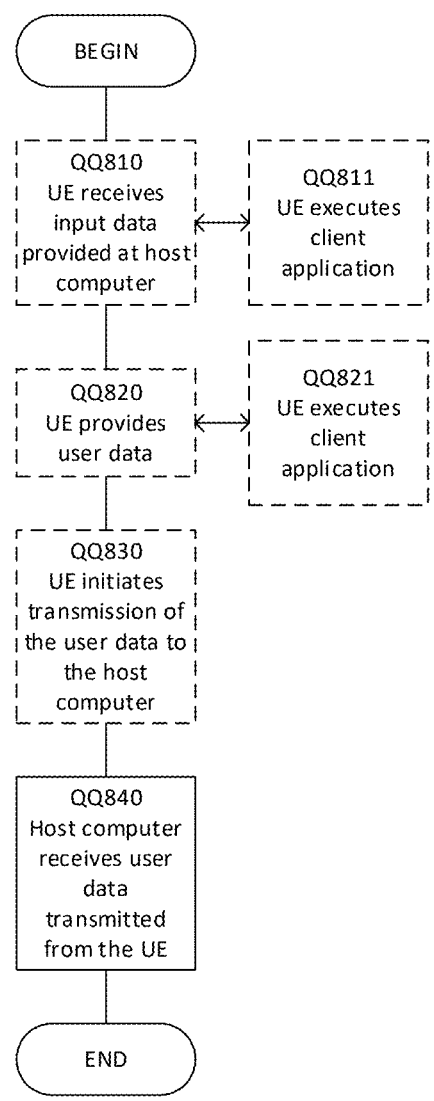
FIG. 18 shows methods implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
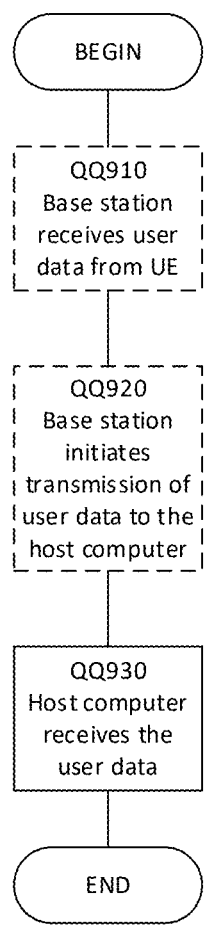
FIG. 19 shows methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Figure 20:
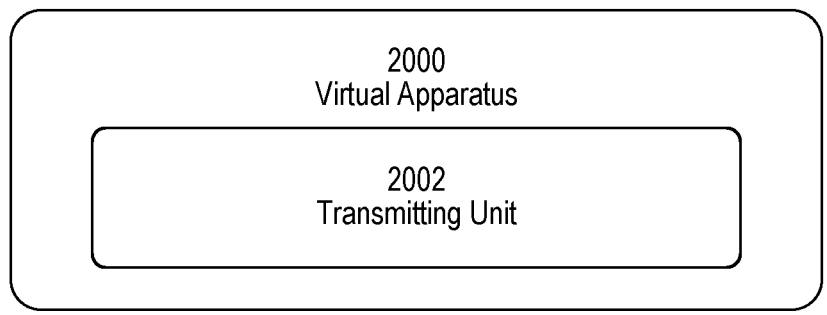
FIG. 20 illustrates a schematic block diagram of an apparatus in a wireless network.

FIG. 20 illustrates a schematic block diagram of an apparatus 2000 in a wireless network (for example, the wireless network shown in FIG. 11). The apparatus may be implemented in a wireless device or network node (e.g., wireless device QQ110 or network node QQ160 shown in FIG. 11). Apparatus 2000 is operable to carry out the example method described with reference to FIG. 1 and possibly any other processes or methods disclosed herein. It is also to be understood that the method of FIG. 1 is not necessarily carried out solely by apparatus 200. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 2002, and any other suitable units of apparatus 2000 to perform corresponding functions according one or more embodiments of the present disclosure.

As illustrated in FIG. 20, apparatus 2000 includes transmitting unit 2002 configured to transmitting the data including the preamble, wherein the preamble includes a first portion comprising a predetermined bit sequence repeated a predetermined number of times, and a second portion comprising a Barker bit sequence.

Figure 21:
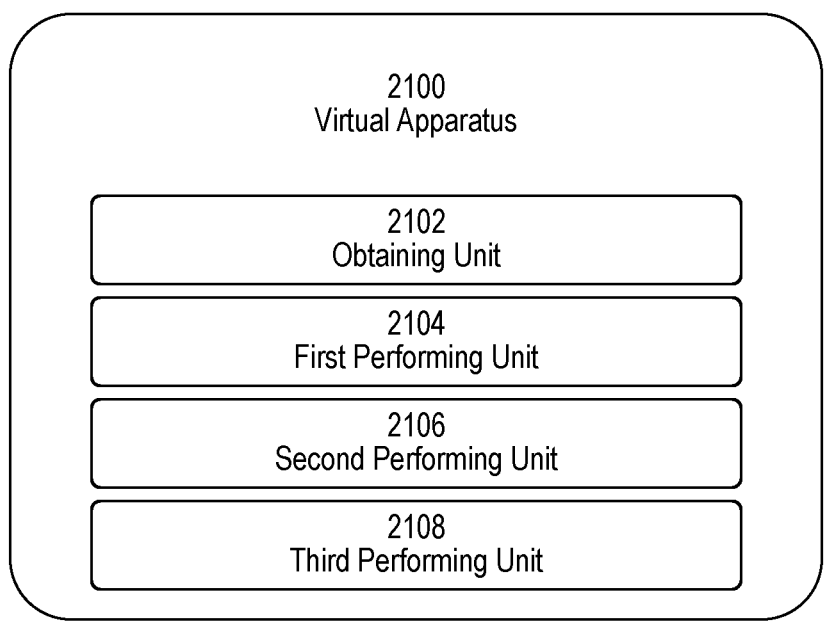
FIG. 21 illustrates a schematic block diagram of an apparatus in a wireless network.

FIG. 21 illustrates a schematic block diagram of an apparatus 2100 in a wireless network (for example, the wireless network shown in FIG. 11). The apparatus may be implemented in a wireless device or network node (e.g., wireless device QQ110 or network node QQ160 shown in FIG. 11). Apparatus 2100 is operable to carry out the example method described with reference to FIG. 2 and possibly any other processes or methods disclosed herein. It is also to be understood that the method of FIG. 2 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 2102, first performing unit 2104, second performing unit 2106, third performing unit 2108, and any other suitable units of apparatus 2100 to perform corresponding functions according one or more embodiments of the present disclosure.

As illustrated in FIG. 21, apparatus 2100 includes obtaining unit 2102 configured to obtain samples of a preamble in a received signal, first performing unit 2104 configured to perform autocorrelation of at least a first portion of the samples to determine a first frequency estimate of the received signal, second performing unit 2106 configured to perform frequency correction on the samples based on the first frequency estimate to obtain first frequency corrected samples, and third performing unit 2108 configured to perform cross-correlation of at least a second portion of the first frequency corrected samples with a Barker bit sequence to determine a first timing estimate of the received signal.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method for transmitting data, wherein the data includes a preamble, the method comprising:
   transmitting the data including the preamble, wherein the preamble includes a first portion comprising a predetermined bit sequence repeated a predetermined number of times, and a second portion comprising a Barker bit sequence;
   wherein one or more of the following apply: the first portion and the second portion share one or more bits, the first portion of the preamble comprises a repeating predetermined symbol bit sequence, the preamble comprises 52 bits, the Barker bit sequence has 13 bits, and the predetermined bit sequence comprises an even number of bits; and
   wherein one or more of the following apply: the number of bits in the predetermined symbol bit sequence is 4, and a number of bits in the predetermined bit sequence with a value '1' is equal to a number of bits in the first portion with a value '0'.

2. The method of claim 1, further comprising:
   obtaining user data; and
   forwarding the user data to a host computer or a wireless device.

3. A method of determining a frequency and timing estimate of a received signal, the method comprising:
obtaining samples of a preamble in a received signal;
performing autocorrelation of at least a first portion of the samples to determine a first frequency estimate of the received signal;
performing frequency correction on the samples based on the first frequency estimate to obtain first frequency corrected samples; and
performing cross-correlation of at least a second portion of the first frequency corrected samples with a predetermined cross-correlation sequence to determine a timing estimate of the received signal, wherein the predetermined cross-correlation sequence includes a Barker bit sequence.

4. The method of claim 3, wherein one or more of the following apply:
performing autocorrelation of at least the first portion of the samples also determines an initial timing estimate of the received signal; and
performing cross-correlation of at least a second portion of the first frequency corrected samples with the predetermined cross-correlation sequence to determine a timing estimate of the received signal comprises performing cross-correlation with a symbol bit sequence comprising the Barker bit sequence and a predetermined symbol bit sequence.

5. The method of claim 3, further comprising one or more of the following:
determining a further frequency estimate of the received signal based on the first frequency corrected samples and the timing estimate;
determining a phase of one or more of the first frequency corrected samples, and obtaining further samples of the received signal based on the determined phase; and
providing user data and forwarding the user data to a host computer via transmission to a base station.

6. The method of claim 5, wherein determining the further frequency estimate comprises determining phases of a plurality of the samples, and determining the further frequency estimate from the phases of the plurality of the samples.

7. The method of claim 6, wherein determining the further frequency estimate from the phases of the plurality of the samples comprises determining a linear model from the phases of the plurality of the samples, and determining a least squares solution to the linear model to obtain the further frequency estimate.

8. The method of claim 5, further comprising performing frequency correction on the first frequency corrected samples based on the further frequency estimate to obtain second frequency corrected samples.

9. The method of claim 8, further comprising determining a phase of at least one of the second frequency corrected samples, and obtaining further samples of the received signal based on the determined phase.

10. The method of claim 3, wherein one or more of the following apply:
one or more samples in the first portion of the samples are also samples in the second portion of the samples;
the first portion of the samples comprise samples of a portion of the signal comprising a repeating predetermined bit sequence;
the preamble of the received signal comprises 52 bits; and
the Barker bit sequence has 13 bits.

11. The method of claim 10, wherein one or more of the following apply:
the predetermined bit sequence comprises an even number of bits; and
the number of bits in the predetermined symbol bit sequence is 4.

12. The method of claim 11, wherein a number of bits in the predetermined bit sequence with a value '1' is equal to a number of bits in the first portion with a value '0'.

13. An apparatus for determining a frequency and timing estimate of a received signal, the apparatus comprising a processor and a memory, the memory containing instructions executable by the processor such that the apparatus is operable to perform the method of claim 3.

14. An apparatus for transmitting data, wherein the data includes a preamble, the apparatus comprising:
a processor; and
a memory, the memory containing instructions executable by the processor such that the apparatus is operable to:
transmit the data including the preamble, wherein the preamble includes a first portion comprising a predetermined bit sequence repeated a predetermined number of times, and a second portion comprising a Barker bit sequence;
wherein one or more of the following apply: the first portion and the second portion share one or more bits, the first portion of the preamble comprises a repeating predetermined symbol bit sequence, the preamble comprises 52 bits, the Barker bit sequence has 13 bits, and the predetermined bit sequence comprises an even number of bits; and
wherein one or more of the following apply: the number of bits in the predetermined symbol bit sequence is 4, and a number of bits in the predetermined bit sequence with a value '1' is equal to a number of bits in the first portion with a value '0'.

15. The apparatus of claim 14, wherein the memory contains instructions executable by the processor such that the apparatus is operable to:
obtain user data; and
forward the user data to a host computer or a wireless device.

* * * * *